United States Patent [19]

Mildern

[11] 3,841,602

[45] Oct. 15, 1974

[54] VALVE

[76] Inventor: William D. Mildern, 8303 W. Sample Rd., Apt. 5, Coral Springs, Fla. 33065

[22] Filed: Nov. 29, 1973

[21] Appl. No.: 420,229

[52] U.S. Cl. ............................... 251/353, 222/148
[51] Int. Cl. ...................... B65d 83/14, F16k 21/00
[58] Field of Search.................... 251/353, 354, 344; 222/148, 402.24, 402.18, 402.1

[56] References Cited
UNITED STATES PATENTS

| | | | |
|---|---|---|---|
| 3,180,535 | 4/1965 | Ward | 251/353 X |
| 3,248,015 | 4/1966 | Giorgi | 251/353 X |
| 3,341,082 | 9/1967 | Meslberg | 222/148 |
| 3,610,481 | 10/1971 | Marratino | 222/402.24 |
| 3,647,121 | 3/1972 | Ayres | 222/402.24 |
| 3,664,557 | 5/1972 | Bruce | 222/402.1 X |

Primary Examiner—William R. Cline
Assistant Examiner—Ira S. Lazarus
Attorney, Agent, or Firm—Davis, Hoxie, Faithfull & Hapgood

[57] ABSTRACT

A valve for a pressurized aerosol dispenser comprises an axially movable, tubular valve body, a diaphragm integral with the valve body and urging it upwardly toward closure, and an annular elastomeric gasket which encompasses the valve body and overlies the diaphragm to provide an annular chamber therebetween when the valve is open. The valve body includes a cylindrical bore through it blocked by a wall which separates the bore into an eduction passageway and a discharge passageway. Vertically spaced, inlet and outlet orifices communicate with the eduction and discharge passageways, respectively, with the inlet orifice located above the outlet orifice. The chamber communicates the orifices with each other when the valve is open. The inner margin of the gasket normally sealingly occludes both orifices to close the valve. The vertical spacing between the orifices provides occlusion of the inlet orifice before the outlet orifice as the valve moves toward closure.

14 Claims, 4 Drawing Figures

PATENTED OCT 15 1974 3,841,602

VALVE

BACKGROUND OF THE INVENTION

The present invention relates to a valve for controlling the flow of a fluid product from a pressurized aerosol dispensing container.

Heretofore, sealing gaskets in valves of this character have been exposed to contact with the product during storage, thereby restricting product formulations to prevent gasket deterioration and leakage or necessitating special gasketing materials. Also, failure of the gasket to properly seal the outlet orifice of a valve of this character caused leakage through the valve since a back-up, or reserve, shut-off had not been conveniently providable. Failure to accomplish complete sealing occlusion of the orifice of prior valves has also been a problem with powdered or suspended particle products. In addition, spring-biased valves require significant force to keep the valve open, thereby undesirably fatiguing the operator when the valve is held open for relatively long periods of time, such as in spraying paint.

SUMMARY OF THE INVENTION

The valve of the present invention is adapted for use with a pressurized aerosol dispensing container and comprises an axially movable, tubular valve body; a diaphragm integral with the valve body and urging it upwardly toward closure; and an annular elastomeric sealing gasket encompassing the valve body and overlying the diaphragm to provide an annular chamber therebetween when the valve is open. The valve body includes a cylindrical bore through it with a wall blocking the bore and separating the bore into an eduction passageway and a discharge passageway. The valve body also includes an inlet orifice in communication with the education passageway and an outlet orifice in communication with the discharge passageway. The chamber communicates the inlet orifice with the outlet orifice when the valve is open. The inlet and outlet orifices are vertically spaced from each other with the inlet orifice above the outlet orifice. The inner margin of the gasket normally sealingly occludes both of the orifices to close the valve. As the value moves toward closure, the vertical spacing between the inlet and outlet orifices provides occlusion of the inlet orifice before the outlet orifice.

It is an object of the present invention to provide a valve with a dual shut-off so that, if the gasket fails to completely occlude one orifice, the occlusion of another orifice will provide an adequate seal to prevent loss of product or propellant.

It is also an object to isolate the gasket from exposure to the product when the valve is closed in order to prevent degradation of the gasket.

It is a further object to provide a valve which can be held open for long periods of time without undue fatigue.

These, and other desired objects which appear in the description of the present invention, are provided by the valve of the present invention.

DESCRIPTION OF THE PREFERRED EMBODIMENT

Figure 1:
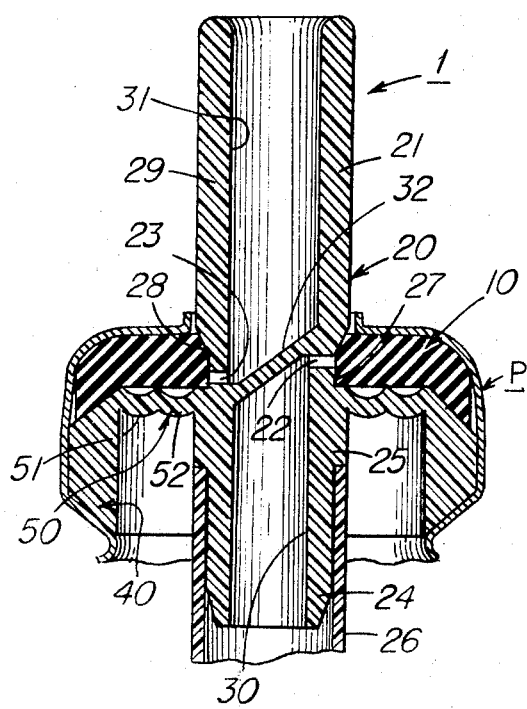
FIG. 1 is a side elevation view, in vertical section, of the valve 1 of the present invention in its closed condition.
Figure 2:
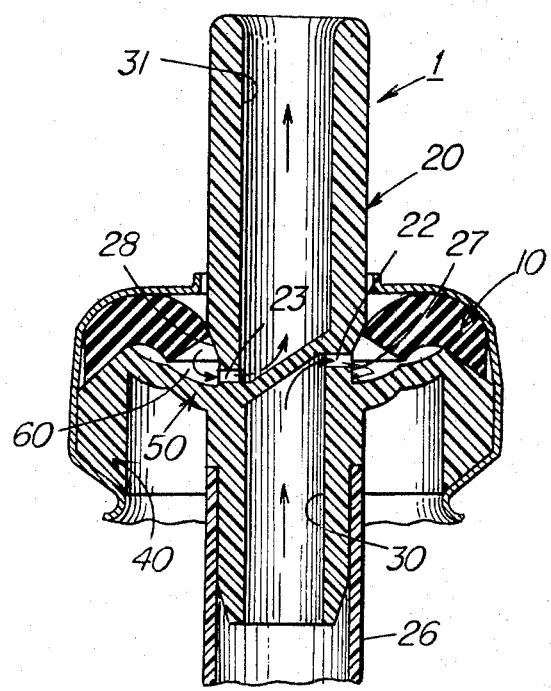
FIG. 2 is a side elevation view, in vertical section, of the valve 1 of FIG. 1 in its open condition.

The valve 1 of the present invention, illustrated in FIG. 1, comprises an elastomeric sealing gasket 10 and a tubular valve body 20 with an integrally associated mounting ring 40 and diaphragm 50. The valve body 20 has an upstanding tubular valve stem 21 with vertically spaced, transverse inlet and outlet orifices 22 and 23, respectively, which operate sequentially so that on closing, the inlet orifice 22 is closed while the outlet orifice 23 remains open, thereby purging the valve 1 of dispensed product. The valve 1 also provides an annular chamber 60 (FIG. 2) interconnecting the orifices 22 and 23 which collapses radially inwardly as the valve 1 closes so that dispensed product in the chamber 60 is squeezed out of the chamber 60 through the outlet orifice 23. This removes residual product from contact with the gasket 10. The diaphragm 50 further isolates the gasket 10 from contact with product in the container during storage. This squeezing and isolation by the diaphragm 50, in conjunction with the aforesaid purging, protects the gasket 10 from deterioration from extended exposure to the dispensed product. In addition, the inlet and outlet orifices 22 and 23, respectively, provide a dual shut-off capability in the valve 1 so that if one orifice should fail to be sealed, the second orifice will still be sealed and prevent product leakage.

The valve 1 is usually crimped in a centrally apertured, upstanding pedestal portion P of a conventional valve mounting cup which is secured to the mouth of a pressurized aerosol dispenser. The valve is used to selectively discharge a pressurized product which is usually a fluid or a powder.

The valve body 20 has a generally tubular and cylindrical configuration and comprises an upstanding tubular valve stem 21, a depending tubular eduction nipple 24 and a tubular base 25 between the valve stem 21 and eduction tube nipple 24. An eduction tube 26 may be slipped over the eduction nipple 24 to draw fluid from the bottom of the container. The valve stem 21 rises axially upwardly from the base 25 and includes a reduced diameter, cylindrical neck 27 through which the transverse inlet and outlet orifices 22 and 23, respectively, pass; an upwardly and outwardly tapered, frustoconical shoulder 28; and an outwardly extending hollow cylindrical tip 29 on top. A cylindrical bore extends axially through the valve body 20 with a septum or wall 32 blocking the bore and separating it into an axial eduction passageway 30 and an axial discharge passageway 31 which are coaxially aligned with each other. The eduction passageway 30 extends upwardly through the eduction tube nipple 24 and into the intermediate base 25 below the wall 32 to communicate with the inlet orifice 22. The discharge passageway 31 extends downwardly through the valve stem 21 into the intermediate base 25 above the wall 32 to communicate with the outlet orifice 23. The eduction and discharge passageways 30 and 31, respectively, conduct fluid or powder product through the valve 1. The integral wall 32 blocks both the upper end of the eduction passageway 30 and the lower end of the discharge passageway 31 and prevents direct communication between the two passageways, 30 and 31.

In addition to the valve body 30, the valve 1 includes the annular mounting ring 40 with resilient diaphragm 50 integrally connecting it to the base 25 of the valve body 20. The integral ring 40 is spaced circumferentially from the valve body 20 so that the valve body 20 is free to move axially vertically by flexure of the diaphragm 50. The bottom of the ring 40 extends angularly outwardly and upwardly so that the crimping of the mounting cup pedestal P adjacent the bottom of the ring 40 wedges the ring 40 upwardly and clamps the outer margin of gasket 10 into sealing engagement between the ring 40 and the mounting cup pedestal P. The top of the ring 40 extends angularly outwardly and downwardly so that this clamping is between the top wall of the mounting pedestal P and the upper edge and top of the ring 40.

The diaphragm 50 extends generally radially from the upper edge of the valve body base 25 to the inner wall of the ring 40. Since it is imperforate, the diaphragm 50 isolates the gasket 10 from the contents of the container. For this reason it also acts as a piston to keep the valve 1 closed because its lower surface is exposed to container pressure and its upper surface is exposed to a lower pressure. Consequently, container pressure forces the diaphragm 50 upwardly against the gasket 10, thereby biasing its integral valve body 20 upwardly into its closed position. Since the valve 1 is actuated by axially depressing the valve body 20, the resilient diaphragm is capable of flexing downwardly. The provision of radially spaced, circumferential corrugations 51 and 52 further facilitates flexion.

The elastomeric sealing gasket 10 has a centrally apertured, annular configuration so that when it is clamped in a transverse orientation by the upper edge of ring 40 its inner margin encompasses and grips the neck 27 and a portion of shoulder 28. The inner margin seals the inlet and outlet orifices 22 and 23, respectively.

In the form of valve illustrated, a sequential sealing of the inlet and outlet is effected by vertically spacing the inlet and outlet orifices 22 and 23, respectively, so that the gasket 10 blocks the inlet orifice 22 before it blocks the outlet orifice 23. Accordingly, the two orifices 22 and 23 are spaced with the inlet orifice 22 above (at the intersection of the neck 27 with the frusto-conical shoulder 28) and with the outlet orifice 23 below (at the intersection of the neck 27 with the base 25 in close proximity with the juncture of the diaphragm 50 with the base 25.) The wall 32 is inclined, or skewed, upwardly so that the lower edge of its top surface is beneath the outlet orifice 23 and the upper edge of its bottom surface is above the inlet orifice 22. As shown, the orifices 22 and 23 lie in a common vertical plane so that they are diametrically opposed to provide maximum circumferential spacing on the neck 17, thereby permitting maximal vertical spacing. The sequential orifice closure afforded by this construction makes the valve self-purging of product.

When the valve 1 is opened (FIG. 2) an annular chamber 60 is formed which communicates inlet orifice 22 with outlet orifice 23. This chamber 60 is defined by the outer surface of the neck 27 and shoulder 28, the lower face and inner marginal surface of the gasket 10, and the upper surface of the diaphragm 50.

If desired, the valve 1 may be modified, such as by providing a transverse vapor tap vent in the base 25 for injecting propellant into the product stream. This propellant injection assists in breaking the product up into a spray.

Figure 3:
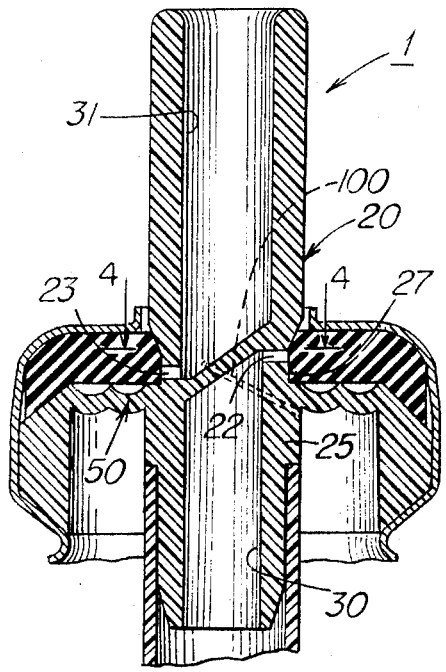
FIG. 3 is a side elevation view, in vertical section, of an alternative embodiment of the valve 1 of FIG. 1.
Figure 4:
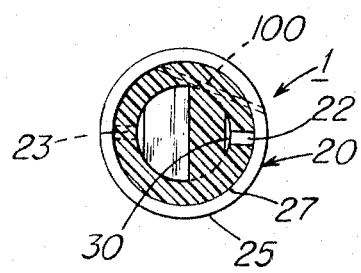
FIG. 4 is a top plan view, iin horizontal section taken along the line 4—4 in FIG. 3, of the valve body 20 of FIG. 3.

In another embodiment, shown in FIGS. 3 and 4, the valve 1 is provided with a purging orifice 100 which conveys propellant from the container to the outside of the neck 27 between the inlet and outlet orifices 22 and 23, respectively, for purging the chamber 60, the outlet orifice 23 and the discharge passageway 31 with propellant after the inlet orifice 22 is closed. The purging orifice 100 also serves as a vapor tap to inject propellant into the product when the valve 1 is open with product flowing through it, thereby facilitating spray formation. The purging orifice 100 extends angularly upwardly through the material of the valve body 20 from the outside of the base 25 adjacent the diaphragm 50 to the outside of the neck 27 at a point located vertically between the inlet and outlet orifices 22 and 23, respectively. While the purging orifice 100 passes alongside the eduction and discharge passageways 30 and 31, respectively, as it passes through the valve body 20, it does not communicate with them.

The valve 1 of the present invention is opened by axially depressing the valve body 20. (See FIG. 2.) The frusto-conical shoulder 28 flexes the sealing gasket 10 downwardly which deflects the inner margin of the gasket 10 out of contact with the inlet and outlet orifices 22 and 23, respectively. With these two orifices 22 and 23 open and in communication with each other via the annular chamber 60, dispensed product flows axially up through the eduction tube 26 and eduction passageway 30; transversely out through the inlet orifice 22; circumferentially through the chamber 60; transversely in through the outlet orifice 23; and, finally, axially up through the discharge passageway 31 for dispensing. (See flow arrows in FIG. 2.) Due to the comparatively large internal volume of the annular chamber 60 and the discharge passageway 31 and to the decreasing ambient pressure within them, pressurized product can expand as it passes through them. Consequently, the chamber 60 and passageway 31 can act as sequential expansion chambers.

Unlike a spring-operated valve, the force required to keep the valve 1 open is less than the force required to open it, since at least some of the elevated container pressure is present in the chamber 60 when the valve 1 is open and counteracts the upward force of container pressure on the diaphragm 50. When the valve 1 is closed the upward force predominates. Consequently, keeping the valve 1 open for long periods of time, such as when spraying paint or insecticide, is less fatiguing than when using a conventional spring-operated valve.

When downward force on the valve body 20 is released, the force of container pressure on the diaphragm 50 urges the valve body 20 upwardly and the valve 1 starts to close. As the gasket 10 returns upwardly to its original unflexed, or planar, condition, its inner margin blocks off and seals the inlet orifice 22 first, thereby terminating fluid ingress to the valve 1. Contemporaneously, the annular chamber 60 starts to collapse radially inwardly starting at the juncture of the gasket 10 with the ring 40, thereby squeezing residual product in the chamber 60 out of the outlet orifice 23. Pressurized product remaining in the chamber 60 after the inlet orifice 22 closed would expand and would force some product out of the chamber 60, thereby purging the chamber 60, the outlet orifice 23 and the discharge passageway 31. Finally, valve body 20 returns to its uppermost position with the outlet orifice 23 blocked and the chamber 60 collapsed to its greatest extent. Since upward force on the diaphragm 50 from container pressure is greater than the downward force of atmospheric pressure, the valve 1 remains closed with both orifices 22 and 23 blocked and the diaphragm 50 sealing the gasket 10 from the potentially deleterious product in the container interior.

It should be understood by one skilled in the art that various modifications may be made to the present invention which are within the spirit and scope thereof as described in the specification and defined in the appending claims.

I claim:

1. A valve for a pressurized aerosol dispensing container which valve comprises
    an axially movable, tubular valve body which includes
        a cylindrical bore therethrough with a wall blocking the bore and separating the bore into
            an eduction passageway and
            a discharge passageway,
        an inlet orifice in said valve body in communication with said eduction passageway,
        an outlet orifice in said valve body in communication with said discharge passageway, and
        said inlet and outlet orifices being vertically spaced from each other with said inlet orifice above said outlet orifice;
    a diaphragm integral with said valve body and urging said valve body upwardly toward closure; and
    an annular elastomeric sealing gasket
        encompassing said valve body with its inner margin normally sealingly occluding both of said orifices to close said valve and
        overlying said diaphragm to provide an annular chamber therebetween when said valve is open which chamber communicates said inlet orifice with said outlet orifice;
    the vertical spacing between said inlet and outlet orifices providing occlusion of the inlet orifice before the outlet orifice as the valve moves toward closure.

2. A valve according to claim 1 wherein
said valve further comprises
    an annular mounting ring integrally joined to the outer margin of said diaphragm,
    said gasket overlying said ring.

3. A valve according to claim 2 wherein
said valve body and said ring are radially spaced.

4. A valve according to claim 1 wherein
said eduction passageway and said discharge passageway are coaxial.

5. A valve according to claim 1 wherein
said inlet and outlet orifices extend transversely.

6. A valve according to claim 1 wherein
said inlet and outlet orifices are diametrically opposed from each other.

7. A valve according to claim 1 wherein
said valve body further includes an upstanding tubular valve stem with an upwardly and outwardly tapered frusto-conical shoulder and a reduced diameter neck at the lower end of said valve stem, said orifices extending through said neck and the inner margin of said gasket encompassing said neck and at least a portion of said shoulder.

8. A valve according to claim 1 wherein
said valve body further includes a cylindrical base attached to said neck with said diaphragm extending outwardly from the base.

9. A valve according to claim 1 wherein
said diaphragm includes at least one circumferential corrugation.

10. A valve according to claim 1 wherein
said diaphragm is imperforate and container pressure urges said diaphragm upwardly to close said valve.

11. A valve according to claim 2 wherein
said diaphragm and said ring underlie said gasket and said diaphragm isolates said gasket from the interior of the container when the valve is closed.

12. A valve according to claim 1 wherein
said inlet orifice communicates with said eduction passageway below said wall and said outlet orifice communicates with said discharge passageway above said wall.

13. A valve according to claim 1 wherein
said valve body includes a purging orifice which extends from the exterior of said valve body at a point below the diaphragm to a point on the exterior of said valve body located vertically between said inlet and outlet orifices to communicate propellant from the interior of the container to the annular chamber after occlusion of said inlet orifice as the value moves toward closure for purging the chamber, the outlet orifice and the discharge passageway.

14. A valve for a pressurized aerosol dispensing container which valve comprises
    an axially movable, tubular valve body which includes
        a cylindrical bore therethrough with a wall blocking the bore and separating the bore into
            an eduction passageway and
            a discharge passageway,
        a transverse inlet orifice in said valve body communicating with said eduction passageway below said wall,
        a transverse outlet orifice in said valve body communicating with said discharge passageway above said wall, and
        said inlet and outlet orifices being diametrically opposed and vertically spaced from each other with said inlet orifice above said outlet orifice;
    a diaphragm integral with said valve body and urging said valve body upwardly toward closure; and
    an annular elastomeric sealing gasket encompassing said valve body with its inner margin normally sealingly occluding both of said orifices to close said valve and
    overlying said diaphragm to provide an annular chamber therebetween when said valve is open which chamber communicates said inlet orifice with said outlet orifice,
    the vertical spacing between said inlet and outlet orifices providing occlusion of the inlet orifice before the outlet orifice as the valve moves toward closure.

* * * * *

UNITED STATES PATENT OFFICE
CERTIFICATE OF CORRECTION

Patent No. 3,841,602            Dated October 15, 1974

Inventor(s) William D. Mildern

It is certified that error appears in the above-identified patent and that said Letters Patent are hereby corrected as shown below:

Column 1, line 38, "education" should be --eduction--;
Column 1, line 45, "value" should be --valve--;
Column 2, line 5, "iin" should be --in--;
Column 3, line 6, "30" should be --20--;
Column 6, line 34 (Claim 13, line 9), "value" should be --valve--.

Signed and sealed this 4th day of March 1975.

(SEAL)
Attest:

RUTH C. MASON
Attesting Officer

C. MARSHALL DANN
Commissioner of Patents
and Trademarks